G. J. CHAMBERS.
HOLDER FOR GARDEN HOSE.
APPLICATION FILED MAY 8, 1912.
1,051,083.
Patented Jan. 21, 1913.
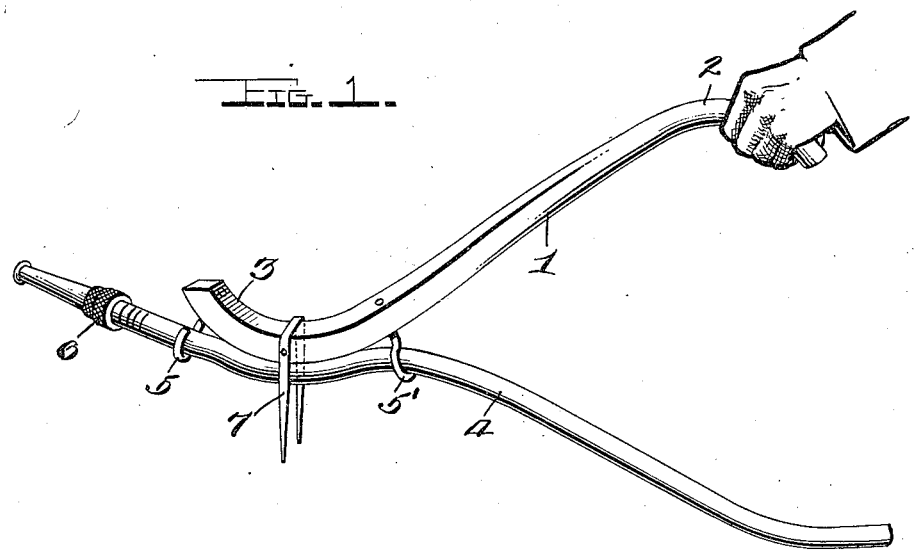
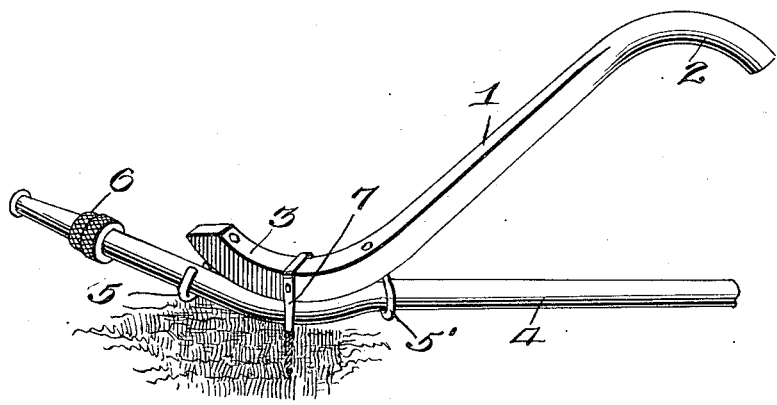
Witnesses
Chas. L. Griesbauer.
A. B. Norton.
Inventor
G. J. Chambers,
By Watson E. Coleman.
Attorney

UNITED STATES PATENT OFFICE.

GEORGE J. CHAMBERS, OF DENVER, COLORADO.

HOLDER FOR GARDEN-HOSE.

1,051,083.　　　　　　　Specification of Letters Patent.　　Patented Jan. 21, 1913.

Application filed May 8, 1912.　Serial No. 695,954.

*To all whom it may concern:*

Be it known that I, GEORGE J. CHAMBERS, a citizen of the United States, residing at Denver, in the county of Denver and State of Colorado, have invented certain new and useful Improvements in Holders for Garden-Hose, of which the following is a specification, reference being had to the accompanying drawings.

This invention relates to new and useful improvements in hose holders and more particularly to a holder for garden hose and has for its object to provide a device which may be operated directly by the gardener or which may be engaged with the ground to position the hose so that the lawn may be sprinkled in the gardener's absence.

A further object of the invention resides in the provision of an elongated member, one end of which is removably engaged with a hose immediately adjacent the nozzle thereof and a still further object resides in providing means at the engaging end of the holder for insertion in the ground to secure the same thereto.

Still another object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a perspective view showing the device applied to use when being held by the operator; and Fig. 2 is a similar view of the same showing the manner in which the holder is engaged with the ground.

In describing my invention, I shall refer to the drawing in which similar reference characters designate corresponding parts throughout the several views and in which—

1 indicates an elongated shank or body member, the same being flat and preferably formed of solid wood, said shank or body member having the upper and lower ends thereof respectively bent or curved in opposite directions as shown at 2 and 3. The upper curved end 2 of the member 1 forms a handle member for the device and the lower curved end 3 is increased somewhat in width and adapted to be engaged with a garden hose 4, as will be hereinafter described. Engaged with the end 3 of the member 1, immediately adjacent the free end thereof, and depending therebelow are the oppositely disposed hook members or loops 5 and 5' which are adapted to receive therein that portion of the hose 4 immediately adjacent the nozzle 6 thereof and extending over this curved portion 3 and secured to the side faces thereof between the hook members is an enlarged staple or the like 7. The arms of this staple member, projecting some distance below the lower edge of the curved end, are adapted to receive in snug engagement therebetween, a portion of the hose 4 and from this construction, it will be seen that the one end of the hose immediately adjacent the nozzle thereof will be securely held to the lower or outer end of the member 1.

In practice, after the hose has been engaged with the lower end of the holder, the gardener may grasp the handle portion 2 thereof and may direct the stream of water flowing from the hose as he sees fit, the length of the holder 1 being sufficient to dispose the nozzle of the hose some distance from the body of the operator, thereby preventing all possibility of said gardener becoming wet. The curvature of the ends of the member 1 in opposite directions will require but a slight movement of the operator's wrist to change the direction of the nozzle and should it be desired to sprinkle the lawn during the operator's or gardener's absence, the depending arms of the staple member 7 may be forced into engagement with the soil, as shown in Fig. 2 of the drawing. In this position, the nozzle is directed somewhat upwardly in view of its engagement with the hook members 5 and 5' and it will be seen that the direction of said nozzle may be readily changed by pressure or other slight action on the handle portion 2 of the device.

From the foregoing it will be seen that I have provided a simple, inexpensive and efficient device for carrying out the objects of the invention and while I have particularly described the elements most well adapted to perform the functions set forth, it is obvious that various changes in form, proportion and in the minor details of construction may be resorted to without departing from the spirit or sacrificing any of the principles of the invention.

Having thus described this invention, what I claim is:—

1. A holder of the class described comprising an elongated body member, the ends of which are curved in opposite directions, hook members carried on one of said curved ends and adapted to receive a garden hose therein, and additional means carried on said curved end of the holder for the retention of said hose thereto, said last mentioned means being adapted for engagement with the soil to retain the holder in a fixed position with respect thereto.

2. A holder of the class described comprising an elongated member, the ends of which are curved in opposite directions, hook members carried on one of the curved ends of said member and adapted to receive a garden hose therein, and an enlarged staple member also carried on the last mentioned curved end of said member adapted to receive said hose therebetween, the dependent arms of said staple member being adapted for engagement with the soil to retain said elongated member in a fixed position with respect thereto.

In testimony whereof I hereunto affix my signature in the presence of two witnesses.

GEORGE J. CHAMBERS.

Witnesses:
 MAUD E. KNAPP,
 L. M. EVANS.

Copies of this patent may be obtained for five cents each, by addressing the "Commissioner of Patents, Washington, D. C."